Jan. 18, 1944.　　　R. SPENCER　　　2,339,744
FLATIRON
Filed July 2, 1941

Inventor:
Richard Spencer,
by Harry E. Dunham
His Attorney.

Patented Jan. 18, 1944

2,339,744

UNITED STATES PATENT OFFICE 2,339,744

FLATIRON

Richard Spencer, Pasadena, Calif., assignor to General Electric Company, a corporation of New York Application July 2, 1941, Serial No. 400,742

4 Claims. (Cl. 219—25)

My invention relates to flatirons and more particularly to electric flatirons of the type having a handle which can be folded down against the top surface of the iron.

An object of my invention is to provide an improved flatiron having a relatively thin body portion and a handle adapted to fold down against the top surface of the iron to form a compact unit requiring little space for packing or storing.

Another object of my invention is to provide an improved handle structure for an iron of the above type which has a simplified construction, is easily extended and folded and which can be manufactured at low cost.

A further object of my invention is to provide an electric flatiron of the above type having an attachment plug receptacle, a section of which is movable to enclose the contact prongs and form with the handle a smooth external surface free from projections tending to interfere with packing or storing the iron.

Further objects and advantages of my invention will become apparent as the following description proceeds and the features of novelty which characterize my invention will be pointed out with particularly in the claims annexed to and forming a part of the specification.

Figure 1:
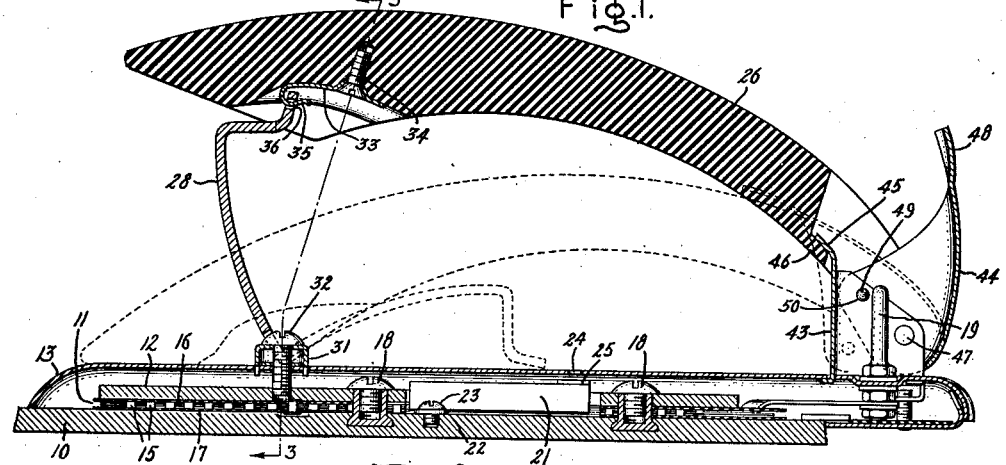
Figure 2:
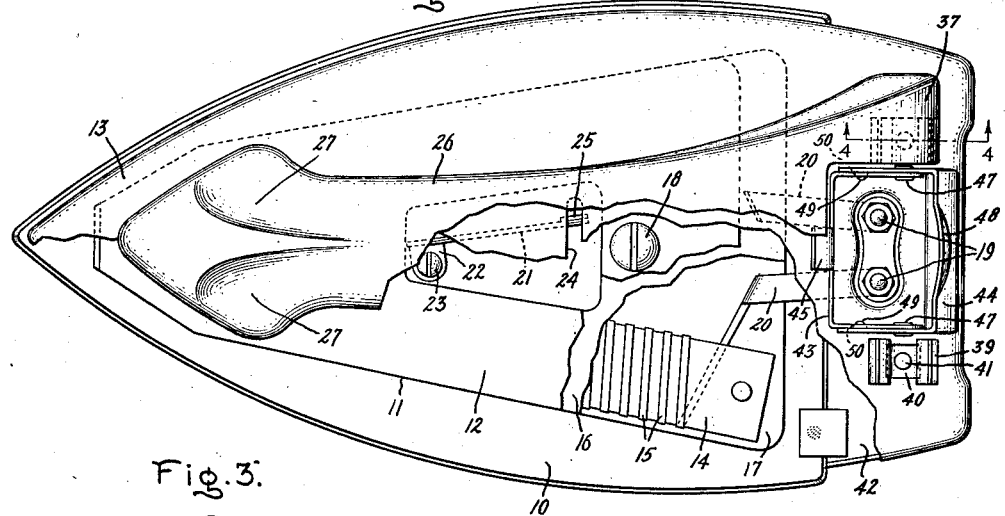
Figure 3:
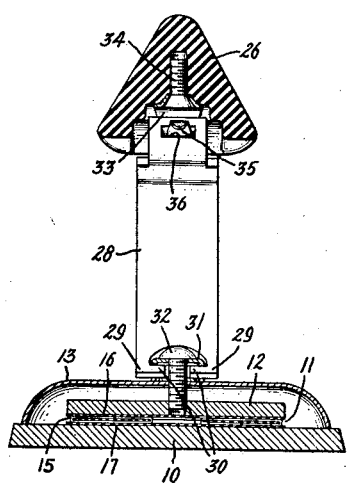
Figure 4:
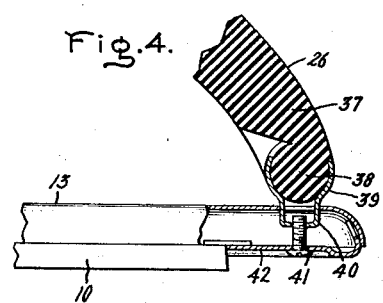

My invention will be better understood by reference to the following description taken in connection with the accompanying drawing in which Fig. 1 is an elevational view, partly in section, of an electric flatiron embodying my invention; Fig. 2 is a plan view of the construction shown in Fig. 1, partly broken away to show certain details of construction; Fig. 3 is a sectional view showing the details of the handle supporting member taken along the line 3—3 of Fig. 1 looking in the direction of the arrows; and Fig. 4 is a sectional view showing details of the pivotal handle mounting taken along the line 4—4 of Fig. 2 looking in the direction of the arrows.

Referring to the drawing, I have shown my invention applied to an electric flatiron having a relatively thin body portion comprising a soleplate 10, a heating element 11, a pressure plate 12, and a cover member 13.

The heating element is constructed in a conventional manner and comprises a core 14 of suitable insulating material, such as mica, upon which is mounted a resistance wire or ribbon 15. Sheets 16 and 17 of suitable insulating material, such as mica, are placed above and below the core 14. The heating element is mounted between the pressure plate 12 and the soleplate 10, the pressure plate being secured to the soleplate by means of screws 18. Current is supplied to the heating element through a pair of contact prongs 19 which are mounted in an upstanding position on the rear central portion of the cover member 13 and electrically connected to the heating element by means of suitable conductors 20.

For the purpose of enabling the user to determine the temperature of the iron while in use, I have provided a temperature indicator comprising a bimetallic member 21, one end of which is supported on the soleplate in heat conducting relation therewith by means of a lug 22 and a screw 23. The opposite end of the bimetallic member 21 is free to deflect in a horizontal direction in accordance with the temperature of the soleplate. By observation, through an elongated opening 24 in the cover 13, of the position of an indicator 25 mounted on the free end of the bimetallic member, the approximate temperature of the soleplate may be determined. If desired, suitable temperature indicating indicia may be placed on the cover adjacent the opening 24.

In accordance with my invention, I provide a movable handle construction for the iron arranged to permit the handle to be folded down against the top surface of the iron when not in use, thereby decreasing the combined over-all height of the iron and the handle and forming a compact unit which may be stored in a small space. Also, in accordance with my invention, I provide a plug receptacle having a member movable to enclose the contact and form with the handle a relatively smooth exterior surface free from projections tending to interfere with packing or storing of the iron. This construction will now be described.

The iron is provided with a downwardly curved handle 26, the rear portion of which is hinged to the rear portion of the iron adjacent the top surface thereof. When the iron is in use the handle is in the ironing position shown in solid lines in which the portion of the handle grasped by the user is spaced a sufficient distance from the top surface of the iron to preclude the possibility of the hand of the user coming in contact therewith. When it is desired to pack or store the iron the handle is folded down into the position shown by the dotted lines in which the front portion of the handle lies adjacent the top surface of the iron. In this position the combined overall height of the iron and the handle is decreased considerably so that the iron occupies but a small space. The fact that the body portion of the iron is relatively thin also contributes materially to the compactness of the unit.

The handle 26 is made of a suitable heat insulating material such as a molded plastic and it will be noted, by reference to Fig. 2 of the drawing, that the front upper portion of the handle is shaped to provide two thumb rests 27 on opposite sides of the handle for both the right and left hands to relieve muscular strain during the ironing operation.

In order to support the handle 26 in the upper or ironing position, I provide a pivotally mounted supporting member 28 extending between the top surface of the iron and the under surface of the front portion of the handle. When it is desired to fold down the handle 26 the supporting member 28 is rotated in a clockwise direction until it comes into contact with the top surface of the iron as shown by the dotted lines. The handle 26 may then be folded into the lower position as described above, the supporting member 28 then occupying an out of the way position beneath the handle.

The construction of the front supporting member 28 is best shown in Fig. 3 of the drawing. It will be noted that the lower portion of the member 28 is provided with spaced leg members 29, the end portions of which are directed inwardly to form pivots 30. The pivots 30 extend into slots located in the side walls of the clamping member 31, the clamping member being held in place on the cover member 13 by means of a screw 32 extending through a hole in the cover member and entering a threaded hole in the pressure plate 12.

For the purpose of holding the supporting member 28 in the vertical or handle supporting position, I provide a latch member 33 secured to the underside of the front portion of the handle 26 by means of a screw 34. The latch 33 is a U-shaped resilient member having a portion 35 adapted to enter a hole 36 in the upper end of the support 28. The portion 35 of the latch is bent so that the support 28 will snap into place and be releasably restrained in the vertical supporting position. It will be understood that, if desired, the support 23 may be pivoted to the under surface of the handle 26 and the latch placed on the top surface of the iron without departing from my invention.

Referring now to the hinge construction of the handle, the rear end portion of the handle is bifurcated and comprises two similar spaced leg members 37. Due to the fact that Fig. 2 of the drawing is partly broken away to show certain details of construction, only one of the leg members 37 is shown but it will be understood that the handle is symmetrical on both sides of the center line. It will be noted by reference to Fig. 4 that the lower portions of the leg members 37 are provided with cylindrically shaped bearing members 38 which are rotatably mounted in resilient U-shaped socket members 39, the legs of the socket members being curved to conform to the shape of the bearing members. It will be observed that this arrangement permits a pivotal movement of the handle about a horizontal axis extending transversely to the longitudinal axis of the iron. The lower portions 40 of the socket members 39 are rectangular in section and extend through rectangular holes located in the cover member 13. The socket members 39 are held in position by means of screws 41 which extend upwardly through suitable holes in a detachable portion 42 of the cover 13, the upper ends of the screws being received in threaded holes provided in the portions 40 of the sockets 39. The portions 40 of the sockets 39 are slightly tapered so that by adjusting the tension of the screws 41 the bearing pressure between the bearing members 38 and the socket members 39 may be varied to give the desired frictional resistance to pivotal movement of the handle 26.

It will be observed that the contact prongs 19 extend upwardly between the spaced leg portions 37 of the handle 26 and are surrounded by a plug receptacle comprising a U-shaped stationary member 43 and a U-shaped movable member 44. The stationary portion 43 of the plug receptacle is secured to the cover member 13 in any suitable manner and has provided adjacent its top portion a bent tab 45 which is arranged to engage a projection 46 on the handle to prevent upward pivotal movement of the handle beyond the ironing position. The movable member 44 is pivotally mounted on the stationary member 43 by means of pivotal connections 47 extending through the overlapping leg portions of the U-shaped members 43 and 44. It will be noted that when the member 44 is in the position shown in solid lines it defines, together with the stationary member 43 and the portion of the handle adjacent the leg members 37, an opening adapted to receive an attachment plug to be connected to the contact prongs 19. When it is desired to store or pack the iron the member 44 may be pivoted in a counter-clockwise direction to the position indicated by the dotted lines in which the contact prongs 19 are enclosed. It will be observed that the member 44 is shaped so that in the closed position its outer surface lies in approximately the same plane as the outer surface of the adjacent leg members 37 of the handle whereby the member 44 forms a smooth continuous surface with the handle free from projections tending to interfere with storing or packing of the iron.

In the closed position, the upper portion of the member 44 overlaps the adjacent portion of the handle and is provided with an upwardly flared portion 48 to facilitate opening of the member 44.

For the purpose of restraining the member 44 in the open position the leg portions thereof are provided with bosses 49 which are adapted to spring into holes 50 in the leg portions of the member 43 and releasably restrain the member 44 into open position.

In operation when it is desired to use the iron the handle 26 is pivoted upwardly to the upper or ironing position and the support 28 is swung upwardly to the vertical handle supporting position where it is held by means of the latch 33. The movable member 44, forming the rear half of the plug receptacle, is then opened to permit the insertion of an attachment plug to be connected to the contact prongs 19. When it is desired to store or pack the iron the support 28 is disengaged from the latch 33 and swung downwardly to a position in which it rests on the top surface of the iron. The handle 26 may then be folded down on the top surface of the iron and the member 44 pushed to the closed position enclosing the contact prongs 19.

From the foregoing it will be apparent that I have provided a flatiron that can be conveniently folded into a small, compact unit, the outer surfaces of which are smooth so that the iron may be slipped into a cloth storing bag or stored adjacent articles of clothing in a suitcase without danger or inconvenience of any projections catching or tearing adjacent material. It will also be apparent that the construction I have provided is sturdy, attractive in appearance, and can be manufactured at low cost.

While I have shown and described particular embodiments of my invention, it will occur to those skilled in the art that various changes and modifications may be made without departing from my invention, and I, therefore aim in the appended claims to cover all such changes and modifications as fall within the true spirit and scope of my invention.

What I claim as new and desire to secure by Letters Patent of the United States is:

1. In combination, an electric flatiron comprising a heating element, a handle secured to said iron, said handle having a bifurcated end portion comprising two spaced leg members forming a recess, a pair of contact prongs connected to said heating element and extending upwardly into said recess for the reception of an attachment plug insertable into said recess, said legs covering said contact prongs at the sides, and a guard member pivotally mounted for swinging movement forwardly and backwardly with reference to said recess and having a wall which when the guard member is moved forwardly substantially covers the top of said recess to protect said contact prongs at the top and which when the guard member is swung rearwardly forms the rear wall of a plug socket for the attachment plug, said handle legs forming the side walls of said socket.

2. In an electric flatiron, a body portion having a heating element, a handle having a bifurcated end portion comprising two spaced leg members, a pair of contact prongs connected to said heating element, said prongs being mounted on said body portion so as to extend upwardly between said leg members, a movable guard member defining with said leg members a plug receptacle adapted to receive an attachment plug to be connected to said prongs, and means for mounting said guard member and said leg members for pivotal movement relative to said body portion whereby said handle and said guard member may be jointly folded downwardly to a position in which said handle lies adjacent the top surface of said body portion, said guard member being shaped to close said receptacle and enclose said contact prongs upon a continued downward movement thereof relative to said handle.

3. In an electric flatiron, a body portion having a heating element, a handle having a bifurcated end portion comprising two spaced leg members, a pair of contact prongs connected to said heating element, said prongs being mounted on said body portion so as to extend upwardly between said leg members, a movable guard member defining with said leg members a plug receptacle adapted to receive an attachment plug to be connected to said prongs, and means for mounting said guard member and said leg members for pivotal movement relative to said body portion to permit said handle and said guard member to be jointly folded downwardly to a position in which said handle lies adjacent the top surface of said body portion, said guard member being shaped to enclose said contact prongs upon a continued downward pivotal movement thereof relative to said handle to a position in which the surface of the guard member lies in approximately the same plane as the outer surface of said leg members whereby said guard member forms with said handle a relatively smooth surface free from projections tending to interfere with packing or storing of said flatiron when said handle is in a folded position.

4. In an electric flatiron, a body portion having a heating element, a handle having a recess at the rear end thereof, a pair of contact prongs connected to said heating element, said prongs being mounted on said body portion so as to extend upwardly into said recess, a movable guard member defining with the portion of said handle adjacent said recess a plug receptacle adapted to receive an attachment plug to be connected to said prongs, and means for mounting said guard member and said handle for pivotal movement relative to said body portion to permit said handle and said guard member to be jointly folded downwardly to a position in which said handle lies adjacent the top surface of said body portion, said guard member being shaped to enclose said contact prongs upon a continued downward pivotal movement thereof relative to said handle to a position in which the surface of the guard member lies in approximately the same plane as the outer surface of said handle whereby said guard member forms with said handle a relatively smooth surface free from projections tending to interfere with packing or storing of said flatiron when said handle is in a folded position.

RICHARD SPENCER.